Sept. 11, 1934.　　　O. L. WOODBURY　　　1,973,192
CALCULATING APPARATUS
Filed May 11, 1933　　　5 Sheets-Sheet 1
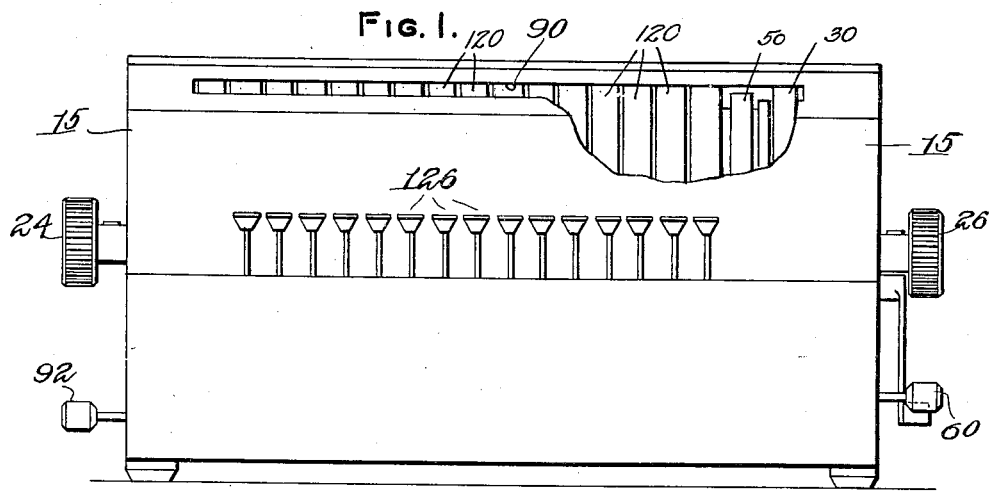
INVENTOR
Orpheus L. Woodbury
BY
J Stanley Churchill
ATTORNEY

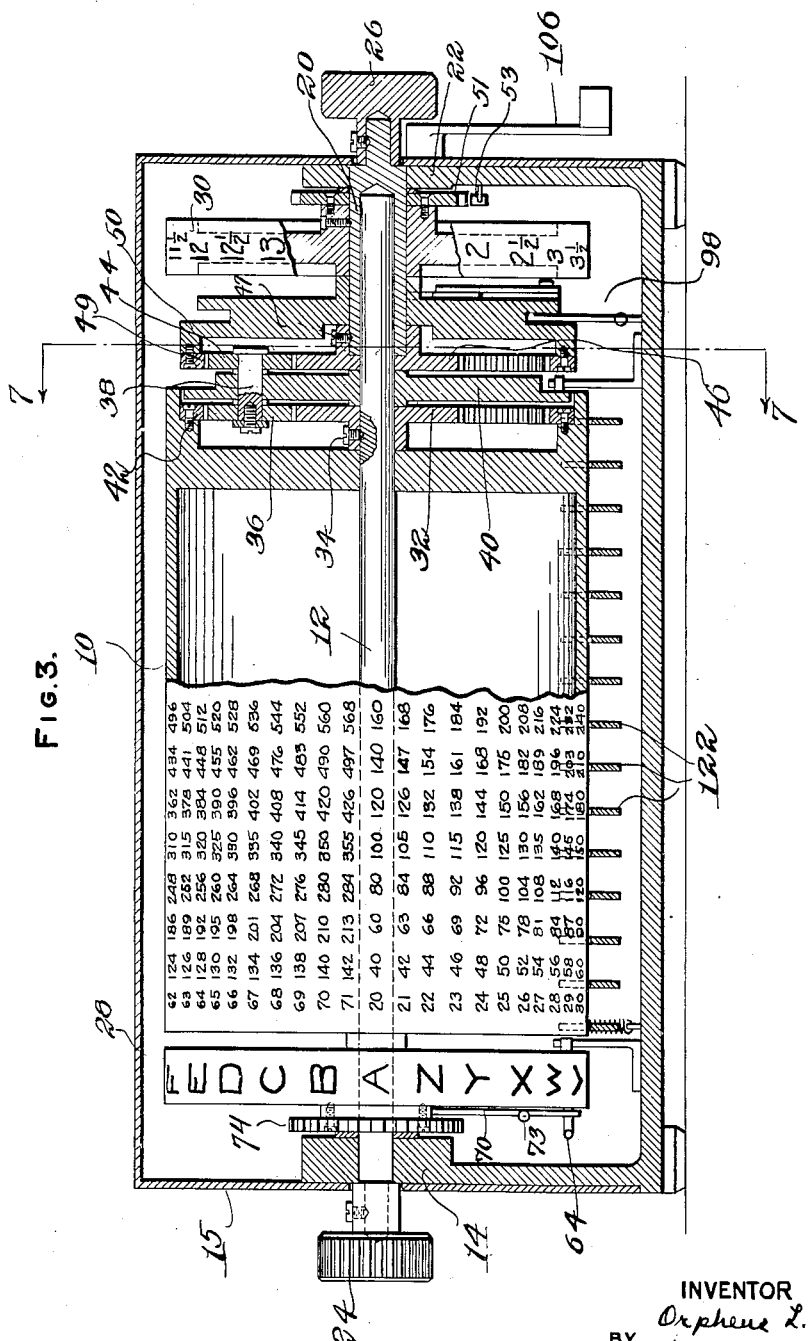

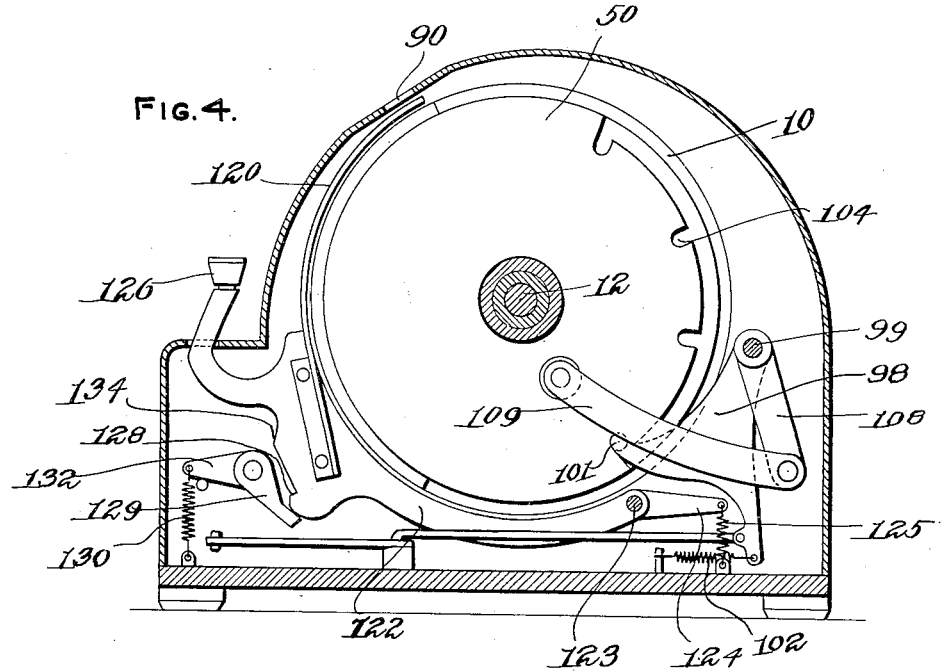
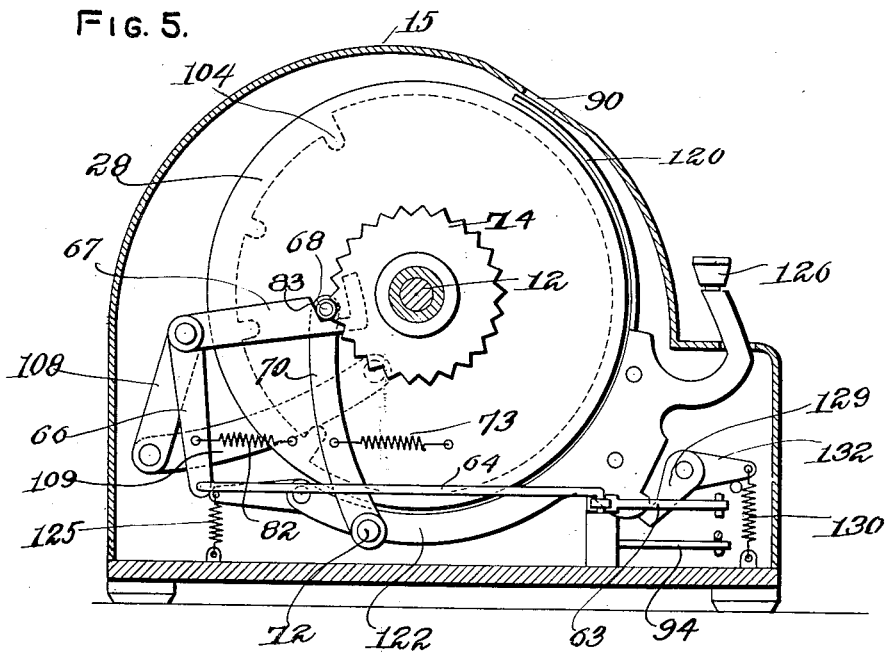

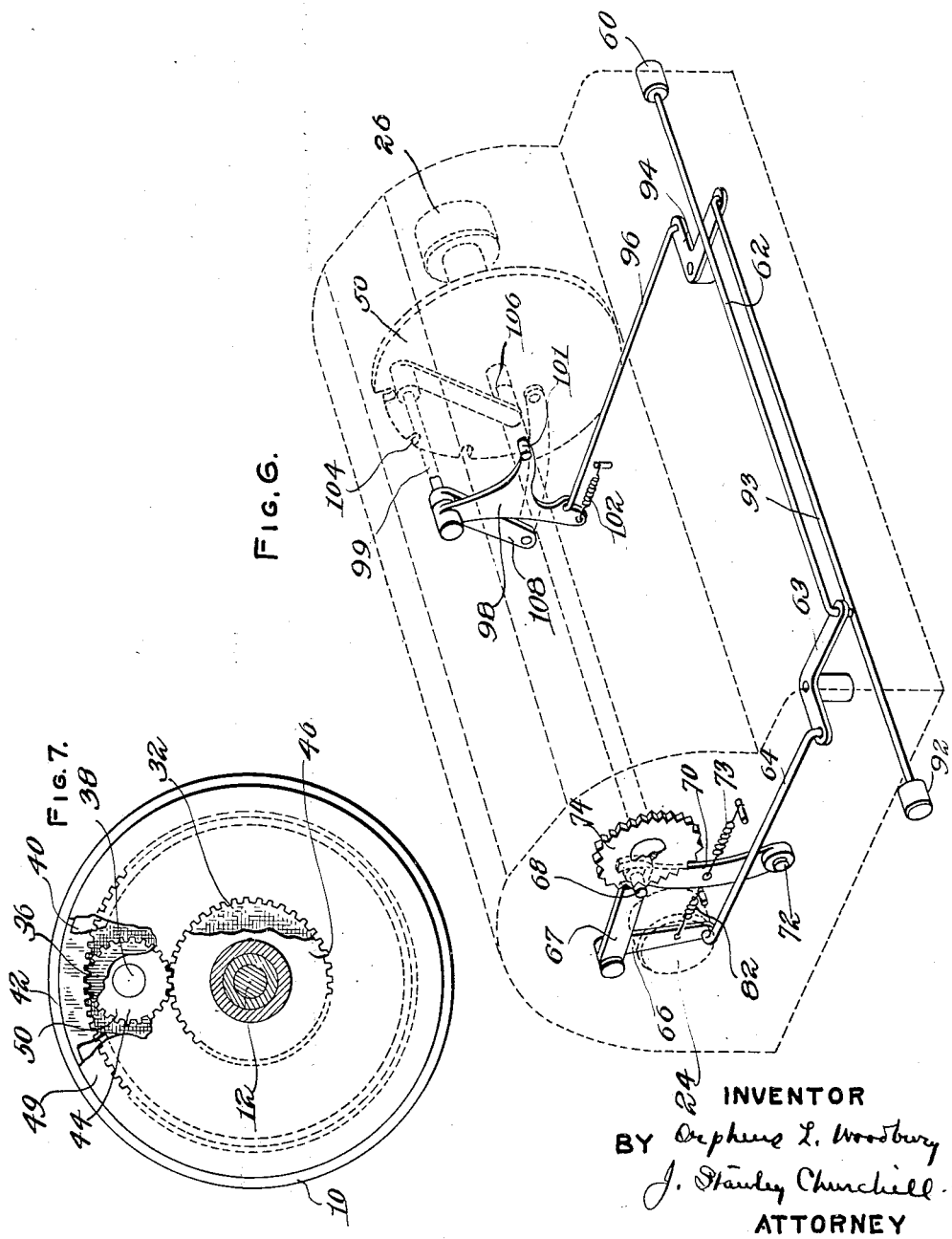

Sept. 11, 1934.     O. L. WOODBURY     1,973,192
CALCULATING APPARATUS
Filed May 11, 1933     5 Sheets-Sheet 5

| | | | | | | | | | | | | | | | | | |
|---|---|---|---|---|---|---|---|---|---|---|---|---|---|---|---|---|---|
| P | 53 | 106 | 159 | 212 | 265 | 318 | 371 | 424 | 477 | 530 | 583 | 636 | 954 | 1272 | 1908 | | 9½ |
| O | 54 | 108 | 162 | 216 | 270 | 324 | 378 | 432 | 486 | 540 | 594 | 648 | 972 | 1296 | 1944 | | 10 |
|   | 55 | 110 | 165 | 220 | 275 | 330 | 385 | 440 | 495 | 550 | 605 | 660 | 990 | 1320 | 1980 | | |
|   | 56 | 112 | 168 | 224 | 280 | 336 | 392 | 448 | 504 | 560 | 616 | 672 | 1008 | 1344 | 2016 | | |
| N | 57 | 114 | 171 | 228 | 285 | 342 | 399 | 456 | 513 | 570 | 627 | 684 | 1026 | 1368 | 2052 | | 10½ |
|   | 58 | | | | | | | | | | | | | | | | |
|   | 59 | | | | | | | | | | | | | | | | |
|   | 60 | | | | | | | | | | | | | | | | 11 |
| M | 61 | | | | | | | | | | | | | | | | |
| L | 62 | | | | | | | | | | | | | | | | 11½ |
|   | 63 | | | | | | | | | | | | | | | | |
| K | 64 | | | | | | | | | | | | | | | | 12 |
|   | 65 | | | | | | | | | | | | | | | | |
| J | 66 | | | | | | | | | | | | | | | | 12½ |
|   | 67 | | | | | | | | | | | | | | | | |
| I | 68 | | | | | | | | | | | | | | | | 13 |
|   | 69 | | | | | | | | | | | | | | | | |
| H | 70 | | | | | | | | | | | | | | | | 13½ |
|   | 71 | 142 | 213 | 284 | 355 | 426 | 497 | 568 | 639 | 710 | 781 | 852 | 1278 | 1704 | 2556 | Mans' | |
| G | 20 | 40 | 60 | 80 | 100 | 120 | 140 | 160 | 180 | 200 | 220 | 240 | 360 | 480 | 720 | | 1 |
| F | 21 | 42 | 63 | 84 | 105 | 126 | 147 | 168 | 189 | 210 | 231 | 252 | 378 | 504 | 756 | | 1½ |
|   | 22 | 44 | 66 | 88 | 110 | 132 | 154 | 176 | 198 | 220 | 242 | 264 | 396 | 528 | 792 | | |
| E | 23 | 46 | 69 | 92 | 115 | 138 | 161 | 184 | 207 | 230 | 253 | 276 | 414 | 552 | 828 | | 2 |
|   | 24 | 48 | 72 | 96 | 120 | 144 | 168 | 192 | 216 | 240 | 264 | 288 | 432 | 576 | 864 | | |
| D | 25 | 50 | 75 | 100 | 125 | 150 | 175 | 200 | 225 | 250 | 275 | 300 | 450 | 600 | 800 | Womans | 2½ |
|   | 26 | 52 | 78 | 104 | 130 | 156 | 182 | 208 | 234 | 260 | 286 | 312 | 468 | 624 | 936 | | |
| C | 27 | 54 | 81 | 108 | 135 | 162 | 189 | 216 | 243 | 270 | 297 | 324 | 486 | 648 | 972 | | 3 |
|   | 28 | 56 | 84 | 112 | 140 | 168 | 196 | 224 | 252 | 280 | 308 | 336 | 504 | 672 | 1008 | | |
| B | 29 | 58 | 87 | 116 | 145 | 174 | 203 | 232 | 261 | 290 | 319 | 348 | 522 | 696 | 1044 | | 3½ |
|   | 30 | 60 | 90 | 120 | 150 | 180 | 210 | 240 | 270 | 300 | 330 | 360 | 540 | 720 | 1080 | | |
| A | 31 | 62 | 93 | 124 | 155 | 186 | 217 | 248 | 279 | 310 | 341 | 372 | 558 | 744 | 1116 | Misses | 4 |
|   | 32 | 64 | 96 | 128 | 160 | 192 | 224 | 256 | 288 | 320 | 352 | 384 | 576 | 768 | 1152 | | |
|   | 33 | | | | | | | | | | | | | | | | |
| Z | 34 | | | | | | | | | | | | | | | | 4½ |
| Y | 35 | | | | | | | | | | | | | | | | 5 |
|   | 36 | | | | | | | | | | | | | | | | |
| X | 37 | | | | | | | | | | | | | | | | |
|   | 38 | | | | | | | | | | | | | | | Childrens | 5½ |
| W | 39 | | | | | | | | | | | | | | | | |
|   | 40 | | | | | | | | | | | | | | | | 6 |
| V | 41 | | | | | | | | | | | | | | | | 6½ |
|   | 42 | | | | | | | | | | | | | | | | |
| U | 43 | | | | | | | | | | | | | | | | 7 |
|   | 44 | | | | | | | | | | | | | | | | |
|   | 45 | | | | | | | | | | | | | | | | |
| T | 46 | | | | | | | | | | | | | | | | 7½ |
|   | 47 | | | | | | | | | | | | | | | | |
| S | 48 | 96 | 144 | 192 | 240 | 288 | 336 | 384 | 432 | 480 | 528 | 576 | 864 | 1152 | 1728 | | 8 |
|   | 49 | 98 | 147 | 196 | 245 | 294 | 343 | 392 | 441 | 490 | 539 | 588 | 882 | 1176 | 1764 | | |
| R | 50 | 100 | 150 | 200 | 250 | 300 | 350 | 400 | 450 | 500 | 550 | 600 | 900 | 1200 | 1800 | | 8½ |
|   | 51 | 102 | 153 | 204 | 255 | 306 | 357 | 408 | 459 | 510 | 561 | 612 | 918 | 1224 | 1836 | | |

Window 90

① ② ③ ④ ⑤ ⑥ ⑦ ⑧ ⑨ ⑩ ⑪ ⑫ ⑱ ㉔ ㊱

Fig. 8.

Inventor.
Orpheus L. Woodbury
by J. Stanley Churchill
Atty.

Patented Sept. 11, 1934

1,973,192

UNITED STATES PATENT OFFICE 1,973,192

CALCULATING APPARATUS

Orpheus L. Woodbury, Wenham, Mass.

Application May 11, 1933, Serial No. 670,455

9 Claims. (Cl. 235—87)

This invention relates to a calculating apparatus.

The object of the invention is to provide novel calculating apparatus capable of use with advantage in connection with the estimation of material requirements in a shoe factory and for similar purposes, and by which the required quantities of material, such as upper leather, for predetermined styles of shoes and in varying sizes and widths and quantities may be estimated in a minimum time and with minimum effort.

With this general object in view, and such others as may hereinafter appear, the invention consists in the calculating apparatus, and in the various structures, arrangements, and combinations of parts hereinafter described and particularly defined in the claims at the end of this specification.

In the drawings, the invention is illustrated as embodied in apparatus for use in connection with a system for estimating the material requirements in the cutting room of a shoe factory, wherein Fig. 1 is a front elevation of the machine with part of the casing broken away; Fig. 2 a partial development of one form of the machine, the ratio drum and associated identifying and size wheels with the classification wheel omitted; Fig. 3 a longitudinal section of the apparatus illustrating the gearing for connecting together the drum and the wheels; Figs. 4 and 5 are sectional right and left end elevations, respectively; Fig. 6 is a perspective view showing the locking mechanism for the identfying wheel; Fig. 7 is a sectional view on the line 7—7 of Fig. 3; and Fig. 8 is a development of the ratio drum and associated identifying, size and classification wheels, with a portion of the numbers of the ratio drum omitted.

In general, in its broader aspects the invention contemplates apparatus comprising at least two members mounted to be capable of movement with relation to one another. One of the members is provided with a sequence of numbers preferably equi-spaced and this member may be referred to as the ratio member. In the illustrated form there are fifty-two numbers starting at 20 and ending at 71. The second member is provided with a series of numbers representing sizes, and in the case of apparatus for use in the cutting room of a shoe factory, the sizes may be laid out to correspond to half sizes from 1 to 13½. These two scales may be used by moving the members with relation to one another so that the range of sizes upon one member is brought successively into register with succeeding combinations or sets of the numbers upon the ratio member. Provision is also made for identifying the proper sets of numbers upon the ratio member which afford the proper ratios between the cutting values for the patterns (comprising the area plus a factor for waste) corresponding to the sizes. For example, A may be the identifying character for a particular type of shoe, corresponding to a position of the movable members in which one pair of size 1 registers with the number 20 on the ratio member, and size 6, the number 30, so that the ratio between the cutting values of sizes 1 and 6 for that type of shoe is as 20 to 30. As the size member is moved with relation to the ratio member, size 1 may be brought into register with succeeding numbers upon the ratio member, and each such position is identified, and in practice the numbers upon the ratio member are selected so that the increments between succeeding numbers represent the proportionate increase in cutting value between succeeding half sizes for any particular style or pattern, and the proper set of numbers and the corresponding identification character may be selected after the particular ratio has been determined by computation from the measurement of two patterns for that particular style, as will be described.

In the illustrated machine, which as above stated is designed for use in connection with the estimation of material requirements in a cutting room of a shoe factory, the sizes from 1 to 13½ by successive half size increments are laid out upon the periphery of a size wheel which is arranged to cooperate with a revoluble drum. The drum is provided on its periphery with an initial column or tabulation of fifty-two equi-spaced numbers starting with 20 and ending with 71. These numbers are selected as a result of experience for the reason that they bear a relation to one another corresponding to the commercial variations or gradings between successive half sizes of shoes. The drum is also preferably provided with fourteen other columns of figures which are multiples of the figures in the first column corresponding to values for from two to twelve pairs of shoes, for eighteen, twenty-four and thirty-six pairs. The casing within which the wheels and drum are mounted is provided with a window or aperture extending across the same, as shown in Fig. 1, and provision is made for uncovering or exposing to view the number underlying the window or aperture in any particular column preferably by the operation of a key actuated shutter, as will be described. In the use of the apparatus, numbers are arrived at by measurement of two sizes of any particular pattern of a shoe, and these numbers are utilized in the operation of the machine to determine, first, the proper ratio identification character which corresponds to that particular pattern, and after such character has been determined, by the manipulation of the machine, one may read directly from the machine values which when multiplied by constants give the number of square feet required for the manufacture of any given number and size of shoes within the limits for which the machine is designed.

Referring now to the drawings, 10 represents a revoluble drum which is loosely mounted upon the shaft 12 journalled at one end in a bearing 14 in a casing 15, and having its other end rotatably received within a hollow sleeve 20 journalled in a bearing 22 at the second end of the casing. Both the shaft and the hollow sleeve are provided with operating knobs 24, 26, respectively, as illustrated in Fig. 1. The machine is also provided with an identifying wheel 28 secured to the shaft 12 to rotate therewith when the handle 24 is turned and also with a size wheel 30 which is secured to and mounted upon the hollow shaft 20 to rotate therewith when the hollow sleeve is turned by means of the operating knob 26, as will be described. Provision is made for gearing together the drum 10, identifying wheel 28 and size wheel 30 in order to permit rotation of the drum in the same direction as the size wheel, when the operating knob 26 is turned and the identifying wheel is held stationary, and also to permit the identifying wheel 28 to effect movement of the drum in the opposite direction when the size wheel is held stationary, as will be described in connection with the operation of the machine.

Accordingly, the shaft 12 is provided with a gear 32 secured thereto by the set screw 34, or otherwise. The gear 32 is arranged to mesh with an idler 36 loose upon a stud 38 rotatably supported in a revoluble disk 40 loosely mounted upon the shaft 12, and the idler 36 meshes with an internal ring gear 42 secured upon the extended end of the drum 10, as shown in Fig. 3. The stud 38 has mounted thereon a second idler gear 44 which cooperates with and meshes with a second gear 46 secured upon the hollow sleeve 20 by a set screw 47, or otherwise. The idler gear 44 also meshes with a second ring gear 49 herein shown as being secured upon the face of a classification wheel 50 loosely mounted upon the sleeve 20 and having provision for being selectively moved and locked in a predetermined number of positions to effect movement of the drum or size wheel, as will be described, in accordance with the various ranges of sizes of shoes, that is, in order to change the relative position of size wheel and the drum for different ranges of shoe sizes. This is necessary if the machine is to be used in calculations for shoes in all size ranges since size 4 is the start of the men's sizes, size 1 is the start of the women's sizes, size 11½ is the start of the misses' sizes, and size 8½ is the start of the children's sizes. From a consideration of the gearing shown in Fig. 3 it will be noted that in the embodiment of the machine illustrated, the gear ratio between the classification wheel 50 and the ratio drum 10 is unity. That is, if all the knobs are held stationary and the classification wheel is turned, the drum 10 will be turned an equal amount relative to the size wheel 30. That is for the different size ranges corresponding to men's, women's, etc., different sets of numbers register with the size indicia upon the size wheel for a given position of the identification wheel. It is, of course, not necessary that this ratio be unity, since other gear ratios can be used if the ratio of spacings between the indicia upon the drum 10 and the wheel 50 is correspondingly varied.

The movements of the drum with the size wheel, when the identifying wheel is held stationary, and also of the relative movement of the drum and identifying wheel, when the size wheel is held stationary, will be understood from consideration of Figs. 3 and 7. When the operating knob 24 is turned in a clockwise direction, for example, see Fig. 7, and the size wheel remains stationary, the identifying wheel and drum rotate in opposite directions. The identifying wheel is directly connected to the operating knob and to the shaft 12 and the drum is connected to the shaft 12 through the gear 32 secured thereto, idler 36, and internal ring gear 42. The ring gear 49 is locked from movement and the gear 46 upon the sleeve 20 remains stationary by the friction of the star wheel 51 and spring pressed detent 53 cooperating therewith during the independent movement of the identifying wheel and drum, thereby holding the pivotal stud stationary to permit the rotation of the idler gear 36 thereon.

In the illustrated embodiment of the invention, the identification wheel 28 makes two revolutions in one direction while the ratio drum 10 makes one revolution in the other. It is to be noted from Fig. 8 that the circumferential spacing of the characters on the identification wheel is twice that of the circumferential spacing of the numerals on the ratio drum. This particular spacing is used in the illustrated embodiment so that any character on the identification wheel can be made to exactly register under the window with any numeral on the ratio drum and so that turning the knob 24 with the other knobs stationary will cause the letters on the identification wheel to move one step while the numbers on the ratio drum move one step. It is not necessary to use the particular gear ratio between the identification wheel and the ratio drum which is used in the illustrated device, since other gear ratios may be used if the relative spacings of the indicia upon the identification wheel and the ratio drum be correspondingly varied so that the conditions set forth in the preceding sentence are satisfied.

On the other hand, when the right hand knob 26 is turned in a clockwise direction and the identifying wheel is held stationary by its locking mechanism, as will be described, then the drum is caused to rotate in the same direction as the size wheel. This is accomplished by reason of the fact that the internal gear 49 remains stationary, thereby causing the pinion 44 to roll around the gear 46 when the latter is turned, and consequently effect the revolution of the shaft 12 and causing the gear 36 to revolve on the pinion 32, and consequently to move the internal gear 42 and the drum in the same direction as the size wheel is turned.

From a consideration of the gearing it will be noted that the size wheel 30 which is rigidly attached to the knob 26 makes two revolutions while the drum is making one revolution in the same direction when the other knobs are stationary. It will be noted from Fig. 1 that the ratio of the circumferential spacing of the size indicia upon the size wheel to the similar spacing of the numerals upon the ratio drum is 2 to 1. This spacing in the illustrated machine is provided so that any one of the size indicia upon the size wheel can be made to exactly register under the window with any number upon the ratio drum and so that turning the knob 26 with the other knobs stationary will cause the indicia upon the size wheel to move one step while the numerals on the ratio drum move one step. It is not necessary to use the particular gear ratio between the size wheel and the ratio drum which is provided in the illustrated machine, since other gear ratios may be used if the relative spacings of the indicia upon the size wheel and ratio drum be correspondingly changed so that the conditions set forth in the preceding sentence are satisfied.

In order to selectively lock and unlock the identifying wheel, the casing is provided with a knob 60 slidably mounted at one end thereof and connected by a link 62 through a bell crank 63 and link 64 to one arm of a bell crank 66, the second arm 67 of which is slotted and receives a locking roller 68 mounted upon the upper end of a lever 70 pivoted at 72 upon the casing. The locking roller 68 is yieldingly urged by a spring 73 into engagement with the teeth of a star wheel 74 secured to the identifying wheel, and when the operating knob is pushed inwardly the bell crank 66 is swung to lower the slotted arm 67 thereof and permit the shaft 12 to be rotated when the operating knob 24 is turned, the roller 68 riding over the teeth of the star wheel 74. When the knob 60 is released, a spring 82 acting on the first arm of the bell crank 66 serves to raise the second arm 67 and the wall 83 of the slot therein holds the roller 68 in engagement with the teeth of the star wheel 74 and prevents rotation of the shaft 12 and identifying wheel, and consequently operates to lock the identifying wheel. When the knob 60 is pushed inwardly as above stated, the slotted arm of the bell crank is caused to drop, permitting the roller 68 to ride over the teeth of the star wheel 74 when the shaft and identifying wheel are turned by the operating knob 24.

Provision is made for rotating the classification wheel 50 into a plurality of positions to cause the legends "men's, women's, misses', and children's" respectively, to be brought into register with an aperture or window 90 in the casing, and for this purpose the machine is provided with locking mechanism and with actuating mechanism herein shown as including an operating knob 92 connected by a link 93 through a bell crank 94 and second link 96 to a lever 98 pivoted upon an operating shaft 99 mounted in bearings in the casing, and having a locking roll 101 which is urged by a spring 102 into engagement with one of a series of locking recesses 104 in the periphery of a portion of the classification wheel 50, as illustrated in Figs. 3 and 4. The classification wheel 50 is designed to be turned by an operating handle 106 secured to the outer end of said operating shaft 99 so that when the shaft is turned its rotations are transmitted through a lever 108 secured thereto and connecting rod 109 pivotally connected to the face of the classification wheel, whereby as the handle is rotated the classification wheel is advanced when permitted to move by the withdrawal of the locking roll 101 from the particular recess 104 at which it is at that time received. The operation of the mechanism 80 will be apparent from an inspection of Figs. 3, 4 and 6.

In order to permit the figures in the several columns corresponding to the number of pairs of shoes for which it is desired to compute the estimated material requirements to be selectively exposed to view, the machine is provided with a plurality of shutters 120 (Figs. 1 and 4) designed when depressed to expose to view the figures beneath the window or aperture 90 in the casing, there being one shutter for each column of figures. The individual shutters 120 are each mounted upon a curved piece 122 pivoted upon an operating shaft 123 to which is fastened a lever 124 having a spring 125 connected thereto for the purpose of returning the shutter and parts after the same has been depressed. The curved piece is provided with an integral key 126 extended upwardly through a slot in the casing, and when the operator depresses the key, the shutter moves between the drum and the casing into a depressed position sufficient to expose to view the underlying number of the column of figures upon the drum. In order to lock the key and the parts in their depressed position, each curved piece 122 is provided with an abutment 128 with which a dog 129 cooperates, all of the latter being urged into locking position by a single spring 130 connected to an arm 132 secured to the shaft upon which the locking members are mounted.

When a succeeding key 126 is depressed, the abutment operates to move its dog 129 to the left, viewing Fig. 4, and consequently through the operating shaft to move the dog 129 for the previously depressed key to the left, viewing Fig. 4, and out of the path of the abutment 128, thereby permitting the spring to cause the key and associated parts to be immediately raised. A second cam surface 134 is provided upon each curved piece in order to insure the movement of the dogs to the left, viewing Fig. 4, when the key is depressed.

In the use of the illustrated apparatus for estimating the material requirements in the cutting room of a shoe factory, the figures and tabulations upon the drum, and upon both the size and identifying wheels are based upon the fact that the sizes of shoes vary in commercial practice by successive half size increments from 1 to 13½, and accordingly on the size wheel 30 there are tabulated in equi-spaced relation the numbers from 1 to 13½ by half sizes, making twenty-six numbers, as shown in Figs. 2 and 8. Similarly, I have provided twenty-six identifying characters in equi-spaced relation around the surface of the identifying wheel 28, and for convenience these twenty-six characters have been designated by the letters of the alphabet. Upon the left hand or initial column of the drum 10 I have tabulated fifty-two numbers around the periphery of the drum, starting with the number 20. In each succeeding column corresponding to the number of pairs from 1 to 12, I have tabulated the multiples of the numbers 20, 21, etc. in corresponding positions upon the drum. As herein shown, I have also tabulated columns representing eighteen pairs, twenty-four pairs, and thirty-six pairs, the figures tabulated being the proper multiples of the original left hand column of figures.

Preparatory to using the present apparatus the first step is to ascertain by measurement of two patterns for any particular style of shoe, of the material requirements or cutting values in square feet necessary or required to produce the pattern and to provide the required factor to take care of waste in cutting. These values may be obtained by any usual or preferred method now in common practice, and for the sake of illustration and to facilitate computation, let it be assumed that these cutting values for a particular style of women's shoe for one pair of size 3 and one pair of size 8 were 1.4236 and 1.9556 square feet, respectively. From these two measured values, a number is computed for use in identifying the particular ratio classification for the particular style of pattern. In computing the number it will be remembered that between sizes 3 and 8 are ten half size increments, so that if I add the cutting values for size 3 and size 8, I obtain a cutting value of 3.3792, which represents twice the average or middle size cutting value, and in this particular case represents twice the cutting value for size 5½. If now the difference is taken between the cutting values for size 3 and size 8, this difference, which is .5320 will represent the ten half size increments which are successively added to the cutting value for size 3 in order to produce the cutting value for size 8, so that one-tenth of the difference between the cutting values of these two measured patterns or .0532 may be assumed to be the average increment. If then, I now divide the sum by the average increment, I get a number which in this particular case works out as follows:

3.3792 divided by .0532 equals 63.52

Using this data the apparatus is now used to estimate the amount of material necessary to cut any number of shoes of any size and classification. In using the machine, the classification wheel is set to "Womens" by pushing knob 92 to release the locking mechanism for the classification wheel and turning the crank 106 until the legend "Womens" appears under the window 90 and then releasing the knob 92 to again set the locking mechanism. The size wheel is then set at size 5½, corresponding to the mid or average size between sizes 3 and 8, by turning knob 26 until "5½" on the size wheel 30 appears under the window 90. The key 126 corresponding to two pairs of shoes and which operates the shutter covering the second column of figures from the left end of the drum, is then depressed to expose the numbers of this column of figures under the window 90. Knob 24 is then turned to turn the drum 10 and the identification wheel 28 in opposite directions until the figure in the second column which most closely approaches the number 63.52 computed as above described, appears under the window 90. By reference to Fig. 8, it will be seen that 64 of the second column most nearly approaches the computed number 63.52. In the particular machine illustrated, the arrangement of letters on the identification wheel 28, the numbers on the drum 10 and the sizes on the size wheel 30, is such that the letter "D" will appear under the window when the size wheel is set at "5½", the classification wheel set at "Womens" and the drum 10 at "64" for two pairs of shoes. This can be shown from Fig. 8 as follows:

The size wheel 30 of Fig. 8 is shown as being set at "2½" for reasons which will hereinafter appear. However, if in the setting of the machine illustrated in Fig. 8, knob 24 is left in locked position, and knob 26 turned so as to rotate the size wheel 30 and the drum 10 in the same direction so as to expose progressively larger sizes on the size wheel, size "5½" will appear under the window when 64 of the second column of figures appears under the window. This is true since the gear ratio between the size wheel 30 and the drum 10, in the illustrated machine, is 2 to 1. In other words, when the knob 26 is turned the figures representing the sizes on Fig. 8 will move up twice as far as the numerals on the drum. This will put size "5½" under the window 90 and 64 of the second column of figures under the window.

The letter "D" of the identification wheel, identifies the proper ratio and the identification wheel 28 is maintained in this position in estimating material for all sizes and number of pairs of shoes of this particular style.

The various cutting values corresponding to the different sizes and corresponding to the different number of pairs may now be estimated by setting the machine to the required number of pairs and size while retaining the determined ratio identification character "D" under the window, and then multiplying the value or number read from the drum by a corrected constant. This corrected constant is obtained by dividing the sum of the cutting values of the two selected patterns (in this case 3.3792) by the number found in column 2 nearest the computed number (in this case 64). Making this division, the corrected constant in the present example becomes .0528.

If, for example, the cutting value of six pairs of shoes of size 2½ is required the knob 26 is turned until "2½" on the size wheel 30 appears under the window. The key 126 corresponding to six pairs of shoes (the 6th key from the left in Fig. 1) is depressed to remove the shutter over the 6th column of figures of the drum so as to expose the number of this column of figures which is under the window. This setting of the machine is illustrated in Fig. 8. It will be noted that the number in the 6th column under the window, is "156". If this number is multiplied by the corrected constant, namely .0528, it will give the cutting value or the amount of material required to cut six pairs of shoes size 2½ of women's shoes identified as style "D". Multiplying these two numbers gives 8.237, estimated as 8¼ square feet for the required cutting value.

As another illustrated example, let it be assumed that the cutting values for a particular style of women's shoe for one pair of size 3 and one pair of size 8 were .2400 and .3100 square feet respectively. The sum and difference of these two numbers, namely .5500 and .0700 respectively are then calculated. The sum .5500 is then divided by one tenth of the difference .0070 to give the calculated number 78.57.

The calculating apparatus is now used by setting the size wheel at size 5½ corresponding to the mid or average size between sizes 3 and 8 from which the computed number 78.57 has been calculated, and depressing the key 126 for two pairs of shoes, the identifying wheel is turned until the nearest number to the computed number 78 is exposed under the window. In the illustrative example, the proper ratio identification character turns out to be K, and this ratio holds true for all sizes and quantities of this type of pattern. The various cutting values corresponding to the different sizes and corresponding to the different number of pairs may now be determined by setting the machine to the required number of pairs and size while retaining the determined ratio identification character K, under the window and then multiplying the value or number read from the drum by a corrected constant. This corrected constant is obtained by dividing the sum of the cutting values of the two selected patterns, and which in the above example amounts to .5500, by 78, to-wit, the number read from the machine, to obtain the corrected constant, which in the illustrative example amounts to .00705. If, for example, the cutting value for ten pairs of shoes of size 6 is required, the value 400 is read from the drum and multiplied by the corrected constant .00705, giving the result 2.82, which would be estimated as 3 square feet. In actual practice, in the cutting room the order of magnitude of the results is well-known, and no attention need be paid to the decimal points.

While the preferred embodiment of the invention has been herein illustrated and described, it will be understood that the invention may be embodied in other forms within the scope of the following claims.

Having thus described the invention what is claimed is:—

1. Calculating apparatus of the character described comprising two relatively movable members, one being provided with a sequence of numbers proportional to the corresponding cutting values required for a series of sizes of articles different ranges of said numbers being proportional to the cutting values of the sizes of different styles of said articles, the second member being provided with a size scale adjacent said numbers, and a third member for indicating the range of said numbers cooperating with said size scale.

2. Calculating apparatus of the character described, comprising a rotatable calculating drum, an identifying wheel and a size wheel, means for gearing together the wheels and the drum to effect rotation of the drum first in one direction and then in the opposite direction by the selective rotation of the identifying and size wheel in the same direction, a sequence of numbers tabulated around the drum proportional to the cutting values required for a series of articles, and a sequence of correlated sizes tabulated around the size wheel.

3. A calculating machine having, in combination, a calculating drum, an identifying wheel cooperating with one end of the drum, a size wheel cooperating with the second end of the drum, the drum being provided with a sequence of numbers proportional to the cutting values required for a series of correlated sizes of articles, the identifying wheel being provided with twenty-six identifying characters, the size wheel being laid out in half sizes from 1 to 13½, means for gearing together said wheels and drum to permit rotation of the drum first in one direction and then in the opposite direction by the selective rotation of the identifying and size wheel in the same direction, and a locking device for the identifying wheel.

4. A calculating machine having, in combination, three rotatable elements, one element being provided with a sequence of numbers proportional to the cutting values required for a series of sizes of articles, a second member being provided with a correlated size scale, the third member having provision for indicating the different operative relative positions occupied by the first two members, and connections between said members for enabling the first member to be moved in one direction upon movement of the second member in the same direction, and for enabling the first member to be moved in the opposite direction upon movement of the third member in the first mentioned direction.

5. A calculating machine having, in combination, a rotatable drum, an identifying wheel at one end of the drum, a size wheel, a classification wheel between the size wheel and the second end of the drum, two operating devices for effecting selective movement of the identifying wheel and size wheel, gearing connections between the operating devices and said drum and wheels, including a gear directly connected to each operating device, an internal ring gear on said drum, an idler meshing with said ring gear and one of the first mentioned gears, a second ring gear secured to the classification wheel, means for selectively locking the classification wheel in different positions, and a second idler mounted to revolve with the first idler under certain conditions of operation and capable of rotation independently thereof, said second idler meshing with the second of the first mentioned gears and with the second ring gear.

6. Calculating apparatus of the character described, comprising three relatively movable members, one being provided with a sequence of numbers proportional to the cutting values required for a series of correlated sizes of articles, the second member being provided with a size scale, and the third being provided with an identifying scale, a classification member, and connections between the classification member and said relatively movable members for effecting relative movement of said members when the classification member is moved.

7. A calculating machine having, in combination, a plurality of rotatable elements, one element being provided with a sequence of numbers proportional to the cutting values required for a series of correlated sizes of articles, a second member provided with a correlated size scale, a third member having provision for identifying the different operative relative positions occupied by the first two members, a classification member, and operative connections between all of said members for enabling the second member to be rotated first in one direction and then in the opposite direction by the selective movement of either the first or third member in the same direction, and for enabling movement of the classification member to effect relative movement of the second and third members.

8. A calculating machine having, in combination, a calculating drum, an identifying wheel, a size wheel, and a classification wheel, and gearing connections between said elements whereby the drum may be moved first in one direction and then in the opposite direction by movement of the identifying wheel or size wheel in the same direction, and whereby movement of the classification wheel effects relative movement of the size wheel and drum, said drum being provided with a sequence of numbers tabulated around the same proportional to the cutting values required for a series of articles.

9. A calculating machine having in combination a movable calculating member, a movable identifying member and a movable size member, and gearing connections between said members whereby the calculating member is moved in opposite directions by respective movements of the identifying member or size member in the same direction, said calculating member being provided with a sequence of numbers tabulated along the same proportional to the cutting values required for a series of articles.

ORPHEUS L. WOODBURY.